United States Patent
Bender et al.

(10) Patent No.: US 10,070,314 B2
(45) Date of Patent: *Sep. 4, 2018

(54) AUTHENTICATION USING DYNAMIC VERBAL QUESTIONS BASED ON SOCIAL AND GEOSPATIAL HISTORY

(71) Applicant: INTERNATIONAL BUSINESS MACHINES CORPORATION, Armonk, NY (US)

(72) Inventors: Michael Bender, Rye Brook, NY (US); David E. Nachman, Morristown, NJ (US); Michael P. Shute, Niantic, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,793

(22) Filed: Nov. 28, 2017

(65) Prior Publication Data

US 2018/0084423 A1 Mar. 22, 2018

Related U.S. Application Data

(63) Continuation of application No. 15/144,313, filed on May 2, 2016, now Pat. No. 9,888,383.

(51) Int. Cl.
*H04W 12/06* (2009.01)
*G06F 21/62* (2013.01)
(Continued)

(52) U.S. Cl.
CPC .......... *H04W 12/06* (2013.01); *G06F 21/31* (2013.01); *G06F 21/6218* (2013.01); *H04W 4/02* (2013.01); *H04M 2201/41* (2013.01)

(58) Field of Classification Search
CPC ......... H04W 12/06; H04W 4/02; H04W 4/00; H04W 4/08; H04W 4/10; H04W 36/0038;
(Continued)

(56) References Cited

U.S. PATENT DOCUMENTS 6,851,051 B1 * 2/2005 Bolle ............... G06F 21/32
713/168
8,955,058 B2 2/2015 Castro et al.
(Continued)

FOREIGN PATENT DOCUMENTS

CN 102833402 12/2012
CN 104243717 12/2014

OTHER PUBLICATIONS

Anonymous; %RBS% Method and Apparatus for User Authentication Based on Dynamic Question-Answer Generation from Social Networks Data; IP.com No. 000216026; Mar. 19, 2012; 4 pages.
(Continued)

*Primary Examiner* — Meless Zewdu
(74) *Attorney, Agent, or Firm* — Schmeiser, Olsen & Watts; William H. Hartwell (57) ABSTRACT

An approach is provided for authenticating a user. Geolocations are collected during a first time period and social media interactions are collected during a second time period. Historical data is polled which indicates (1) geolocations whose timestamps indicate locations of a person authorized to access the device within the first time period and (2) social media interactions whose timestamps indicate interactions of the person within the second time period. A question is generated to be relevant to a social media interaction and/or a geolocation included in the historical data. The voice of the user who provided an answer to the question is verified as matching a voice of the person authorized to access the device. The answer is determined to be correct. Based on the
(Continued)

matching voices and the answer being correct, the user is authenticated and access to the device by the user is granted.

16 Claims, 5 Drawing Sheets

(51) Int. Cl.
  *G06F 21/31* (2013.01)
  *H04W 4/02* (2018.01)
(58) Field of Classification Search
  CPC ..... H04W 12/00; H04W 12/08; H04W 12/02; H04W 12/10; H04M 2201/41; G06F 21/6218; G06F 21/31; G06F 21/62; G06F 21/30; G06F 21/32; G06F 21/313; H04L 9/3231; H04L 63/0861; H04L 9/32
  See application file for complete search history.

(56) References Cited

U.S. PATENT DOCUMENTS

| | | | |
|---|---|---|---|
| 9,122,857 B1* | 9/2015 | Hassan | G06F 21/32 |
| 9,865,268 B1* | 1/2018 | Narayanan | G10L 17/24 |
| 2002/0147914 A1* | 10/2002 | Arnold | G06F 21/32 |
| | | | 713/186 |
| 2003/0065934 A1 | 4/2003 | Angelo et al. | |
| 2003/0179862 A1 | 9/2003 | Sierra et al. | |
| 2005/0171851 A1* | 8/2005 | Applebaum | G06F 21/32 |
| | | | 705/18 |
| 2010/0240018 A1 | 9/2010 | Bethune | |
| 2012/0253810 A1* | 10/2012 | Sutton | G06F 21/32 |
| | | | 704/246 |
| 2013/0036458 A1* | 2/2013 | Liberman | H04L 9/3231 |
| | | | 726/6 |
| 2013/0097682 A1* | 4/2013 | Zeljkovic | H04L 9/3231 |
| | | | 726/7 |
| 2013/0227700 A1 | 8/2013 | Dhillon et al. | |
| 2014/0053258 A1 | 2/2014 | Lin et al. | |
| 2014/0198061 A1 | 7/2014 | Chen | |
| 2014/0230025 A1 | 8/2014 | Abhyanker | |
| 2014/0337930 A1* | 11/2014 | Hoyos | H04L 63/10 |
| | | | 726/4 |
| 2014/0359739 A1* | 12/2014 | Bao | G06F 21/32 |
| | | | 726/7 |
| 2015/0052594 A1 | 2/2015 | Liberman et al. | |
| 2015/0128240 A1* | 5/2015 | Richards | H04L 63/0861 |
| | | | 726/7 |
| 2015/0187359 A1 | 7/2015 | Bhaskaran | |
| 2017/0053280 A1 | 2/2017 | Lishok et al. | |
| 2017/0139888 A1* | 5/2017 | Ramlet | G06F 3/0482 |
| 2017/0318013 A1* | 11/2017 | Roy | H04L 63/0861 |
| 2017/0318461 A1 | 11/2017 | Bender et al. | |

OTHER PUBLICATIONS

Anonymous; System and Method for step-up/multi-factor authentication leveraging mobile device management analytics; IP.com No. 000241524; May 8, 2015; 5 pages.

Teh, Jonathan et al.; Context-aware Social Networking Mechanism for Achieving Lightweight P2P Authentication; IP.com No. 000157020; Aug. 9, 2007; 8 pages.

Syta, James M.; List of IBM Patents or Patent Applications Treated as Related; Nov. 22, 2017; 1 page.

* cited by examiner

AUTHENTICATION USING DYNAMIC VERBAL QUESTIONS BASED ON SOCIAL AND GEOSPATIAL HISTORY

This application is a continuation application claiming priority to Ser. No. 15/144,313 filed May 2, 2016, now U.S. Pat. No. 9,888,383, Feb. 6, 2018.

BACKGROUND

The present invention relates to computer security, and more particularly to authenticating a user of a mobile device.

In computer security, general access control includes authentication, which is the verification of the identity of a person attempting to access a computer system (e.g., a user supplying a user name and password). Access to the computer system is often approved based on successful authentication of a user.

Securing data and applications on a mobile device has become increasingly critical. Unlocking a lock screen of mobile device to gain access to the mobile device may use any combination of known unlocking techniques, including entering a password, using a predefined set of buttons, or performing a certain gesture on the mobile device's touchscreen. While a user is in transit, the user often operates a mobile device in a hands-free environment, (i.e., performs hands-free access of the mobile device to enhance the user's safety and/or because a law requires a hands-free operation of the mobile device by the user while the user is also operating a moving vehicle such as an automobile). In a hands-free environment, unlocking of a mobile device may be provided by known voice recognition or a combination of voice recognition and challenge-response authentication techniques that employ static lists of responses.

In computer security, a spoofing attack includes an attacker attempting to gain access to a mobile device or another computer system by masquerading as another person. For example, an attacker may replay a recording of a user's voice to circumvent a voice recognition feature that provides authentication.

SUMMARY

In a first embodiment, the present invention provides a method of authenticating a user who requests an access to a device. The method includes receiving, by a hardware processor of the device, a request to authenticate the user who is requesting the access to the device. The method further includes in response to the step of receiving the request to authenticate, polling, by the hardware processor of the device, for historical data that includes (1) social media interactions that specify the user and (2) geolocations of the user. The method further includes automatically generating, by the hardware processor of the device, a question that is relevant to a social media interaction included in the social media interactions, a geolocation of the user included in the geolocations, or a combination of the social media interaction and the geolocation of the user. The method further includes receiving, by the hardware processor of the device, a digital representation of a voice that provided an answer to the question. The digital representation of the voice is generated and stored in an audio file format by a digital audio technology coupled to the hardware processor. The method further includes based on the received digital representation of the voice that provided the answer, verifying, by the hardware processor of the device, that the voice that provided the answer matches a voice of the user. The method further includes determining, by the hardware processor of the device, that the answer to the question is correct. The method further includes based on (1) the voice that provided the answer matching the voice of the user and (2) the answer being correct, authenticating, by the hardware processor of the device, the user and granting to the authenticated user the access to the device.

In a second embodiment, the present invention provides a computer program product including a computer-readable storage medium and a computer-readable program code stored in the computer-readable storage medium. The computer-readable program code includes instructions that are executed by a central processing unit (CPU) of a computer system to implement a method of authenticating a user who requests an access to the computer system. The method includes receiving, by the computer system, a request to authenticate the user who is requesting the access to the computer system. The method further includes in response to the step of receiving the request to authenticate, polling, by the computer system, for historical data that includes (1) social media interactions that specify the user and (2) geolocations of the user. The method further includes automatically generating, by the computer system, a question that is relevant to a social media interaction included in the social media interactions, a geolocation of the user included in the geolocations, or a combination of the social media interaction and the geolocation of the user. The method further includes receiving, by the computer system, a digital representation of a voice that provided an answer to the question. The digital representation of the voice is generated and stored in an audio file format by a digital audio technology coupled to the CPU. The method further includes based on the received digital representation of the voice that provided the answer, verifying, by the computer system, that the voice that provided the answer matches a voice of the user. The method further includes determining, by the computer system, that the answer to the question is correct. The method further includes based on (1) the voice that provided the answer matching the voice of the user and (2) the answer being correct, authenticating, by the computer system, the user and granting to the authenticated user the access to the computer system by the user.

In a third embodiment, the present invention provides a computer system including a central processing unit (CPU); a memory coupled to the CPU; a digital audio system coupled to the CPU; and a computer-readable storage device coupled to the CPU. The storage device includes instructions that are executed by the CPU via the memory to implement a method of authenticating a user who requests an access to the computer system. The method includes receiving, by the computer system, a request to authenticate the user who is requesting the access to the computer system. The method further includes in response to the step of receiving the request to authenticate, polling, by the computer system, for historical data that includes (1) social media interactions that specify the user and (2) geolocations of the user. The method further includes automatically generating, by the computer system, a question that is relevant to a social media interaction included in the social media interactions, a geolocation of the user included in the geolocations, or a combination of the social media interaction and the geolocation of the user. The method further includes receiving, by the computer system, a digital representation of a voice that provided an answer to the question. The digital representation of the voice is generated and stored in an audio file format by the digital audio system. The method further includes based on the received digital representation of the voice that provided the answer, verifying, by the computer system, that the voice that provided the answer matches a voice of the user. The method further includes determining, by the computer system, that the answer to the question is correct. The method further includes based on (1) the voice that provided the answer matching the voice of the user and (2) the answer being correct, authenticating, by the computer system, the user and granting to the authenticated user the access to the computer system.

Embodiments of the present invention protect assets of a mobile device by preventing an unauthorized user from using a recording of a user's response to a security question or using the unauthorized user's knowledge of the correct response to the security question to maliciously bypass voice recognition-based authentication on the mobile device.

DETAILED DESCRIPTION

Overview

Embodiments of the present invention recognize that unlocking a lock screen of a mobile device in a hands-free environment presents unique challenges in protecting data and applications of the mobile device from access by an unauthorized user who can circumvent one or more known authentication features. The use of voice recognition to secure the mobile device leaves gaps in protecting the mobile device. An attacker may play back a recording of the authorized user's voice to spoof the voice recognition-based authentication, thereby leaving the assets of the mobile device vulnerable. The use of static lists of responses to security questions (i.e., challenge-response authentication) also leaves gaps in the protection of mobile device assets. An unauthorized user may have knowledge of how an authorized user of a mobile device would respond to static security questions and use that knowledge to provide the correct responses to circumvent the challenge-response authentication of the mobile device. For example, a friend of an authorized user of a smartphone may know and use the correct responses to security questions associated with the authorized user to gain access to the smartphone, even though the authorized user has not authorized the friend to access the smartphone.

Embodiments of the present invention authenticate a user of a mobile device by using a combination of voice recognition and non-static responses to contextual and dynamically generated verbal questions. In one embodiment, the contextual questions are based on the authorized user's social media interactions and/or the geospatial (i.e., geolocation) history of the mobile device, which indicates the historical geolocations of the authorized user. The social media interactions include interactions with the authorized user's social media contacts, which are captured by the mobile device via installed applications such as call logs, texting history, email history, and social network messages and postings. Most mobile devices provide the ability to share at least some of the aforementioned information about social media interactions. A member of the authorized user's social circle (i.e., one of the authorized user's close social media contacts) may share the member's geolocation data with the authorized user, which allows the authentication system described herein to determine that the authorized user and the member of the social circle were at the same location at the same time.

Answers to the aforementioned contextual and dynamically generated questions are known by an authorized user of the mobile device and possibly by close social contacts of the authorized user, but probably not by anyone else. The use of non-static responses to dynamically generated verbal questions based on social interaction and geospatial history makes it difficult for an attacker unknown to the authorized user to know or find out the correct answers to the questions and prevents the attacker from using a recording of the authorized user saying a correct response, thereby decreasing the attacker's ability to bypass the authentication system. Furthermore, the voice recognition aspect of the aforementioned combination prevents someone who has knowledge of the correct responses (e.g., the spouse of the authorized user) from bypassing the authentication system of the mobile device.

The authentication system may generate a question based on geolocation history information, where only the authorized user knows the correct answer (e.g., "When was the last date you were at Diner XYZ?", "What time did you arrive at work yesterday?", and "Have you ever been to Restaurant ABC in Morristown, New Jersey?").

Further, the authentication system may generate a question based on social media interaction, where only the authorized user knows the correct answer (e.g., "When was the last post in social media site FGH from your Mom?"). In another embodiment, the authentication system may generate a question based on the authorized user's call history or email history (e.g., "When was the last time you talked to David on the phone?" and "Has Stephanie emailed you in the last week?").

Still further, the authentication system may generate a question based on a combination of geolocation and social media interaction history, which includes data from another user. The use of the data from the other user requires an opt-in for sharing data between the other user and the authorized user of the device or the ability to track a user's proximity (e.g., "When was the last time you took Grace to Restaurant ABC?" and "Have you ever been to Stadium DEF with Adam?").

System for Authenticating a User Who Requests Access to a Device

Figure 1:
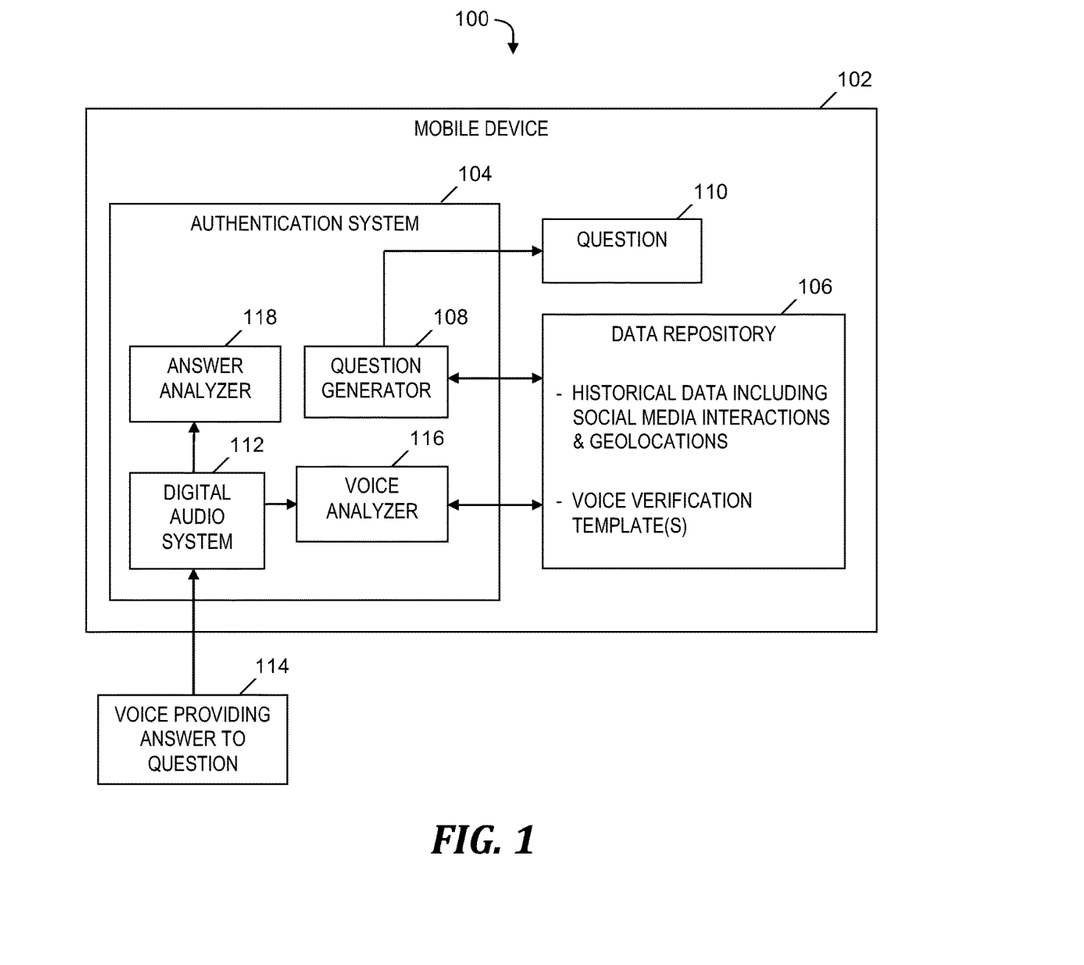
FIG. 1 is a block diagram of a system for authenticating a user who requests an access to a device, in accordance with embodiments of the present invention.

FIG. 1 is a block diagram of a system 100 for authenticating a user who requests an access to a device, in accordance with embodiments of the present invention. System 100 includes a mobile device 102 (e.g., smartphone or computer tablet), which executes a software-based authentication system 104. A user (not shown) is requesting access to mobile device 102 (e.g., by unlocking a lock screen of mobile device 102). Mobile device 102 includes a data repository 106, which stores historical data, including social media interactions that specify the user who is requesting access to mobile device 102. Data repository 106 also includes one or more voice verification templates. One of the voice verification templates stored in data repository 106 represents a voice pattern of the user who is requesting access to mobile device 102.

Authentication system 104 includes a software-based question generator 108, which automatically generates a question 110 that is relevant to (1) one or more social media interactions, but no geolocations; (2) one or more geolocations of the user and/or one or more geolocations of member(s) of the user's social circle, but no social media interactions of the user; or (3) a combination of the one or more social media interactions of the user and the one or more geolocations of the user or member of the user's social circle. Authentication system 104 retrieves the geolocations and/or social media interactions from data repository 106.

Through application frameworks of mobile device 102 and social network application programming interfaces (APIs), authentication system 104 may be built into the operating system (not shown) of mobile device 102 to harvest historical data within a user-configurable time period, where the historical data includes the aforementioned geolocation data from mobile device 102, geolocation data from other mobile devices which are sharing data with the authorized user of mobile device 102, and social media interactions of the authorized user. The configurable time period within which the historical data is gathered may be, for example, 30, 60, 90, or 365 days. In one embodiment, authentication system 104 does not dynamically generate questions based on the gathered historical data unless the amount of historical data already gathered by authentication system 104 meets or exceeds a minimum threshold amount.

Authentication system 104 includes a digital audio system 112, which receives a voice 114 which provides an answer to question 110, transforms voice 114 into a digital audio file, and sends the digital audio file to a voice analyzer 116, which is also included in authentication system 104. Voice analyzer 116 determines whether voice 114 matches the voice of the user who is requesting access to mobile device 102, by determining whether the digital audio file of voice 114 matches the voice template stored in data repository 106 which includes the voice pattern of the user who is requesting access to mobile device 102.

Authentication system 104 also includes a software-based answer analyzer 118, which receives the digital audio file of voice 114 from digital audio system 112. Answer analyzer 118 determines whether the answer provided by voice 114 is a correct answer to question 110.

In one embodiment, the user is not prompted to answer question 110 with an exact date or an exact time; instead, the user may be asked for a month, a day in the week, an hour in the day, a date within a range of dates, or a time within range of times, for example. When the user provides a name in the response to question 110, the user may be required to provide only the first name. Some questions generated by authentication system 104 may be based on information that is more public than other information that is the basis for other questions; therefore, to provide additional security, authentication system 104 is configurable to require the user to answer multiple questions.

If voice analyzer 116 determines that voice 114 matches the voice of the user who is requesting access to mobile device 102 and if answer analyzer 118 determines that the answer provided by voice 114 is a correct answer, then authentication system 104 authenticates the user and in response to the authentication, grants the authenticated user access to mobile device 102 (i.e., unlocks the lock screen of mobile device 102).

Authentication system 104 uses the geolocation data captured by mobile device 102 to relate the geolocation data to physical locations by name (e.g., names of places of business, names of cities and states, and names of countries). In one embodiment, authentication system 104 generates questions about the named physical locations, where each question prompts the user to provide a time that the user arrived, a time the user departed, a date of the user's most recent visit to the location, and an amount of time the user spent at the location.

Authentication system 104 generates questions relating to social media interactions, where the questions prompt the user about the user's interactions with the user's social contacts For example, authentication system 104 generates questions by which the user validates when and/or how the user interacted with a particular contact. The interactions may be gathered form mobile device 102 or from external social networks.

Authentication system 104 may use any geolocation data provided by a social media contact of the user together with geolocation data of the user to determine whether the user and the contact were at the same location at the same time. For example, authentication system 104 generates questions that ask for a location that the user and the contact visited together and a time at which that location was visited by the user and contact.

In an alternate embodiment, system 100 substitutes another computing device (e.g., a desktop computer or laptop computer) for mobile device 102. In another embodiment, one or more portions of the aforementioned historical data may be stored in respective one or more other data repositories (not shown).

Figure 2A:
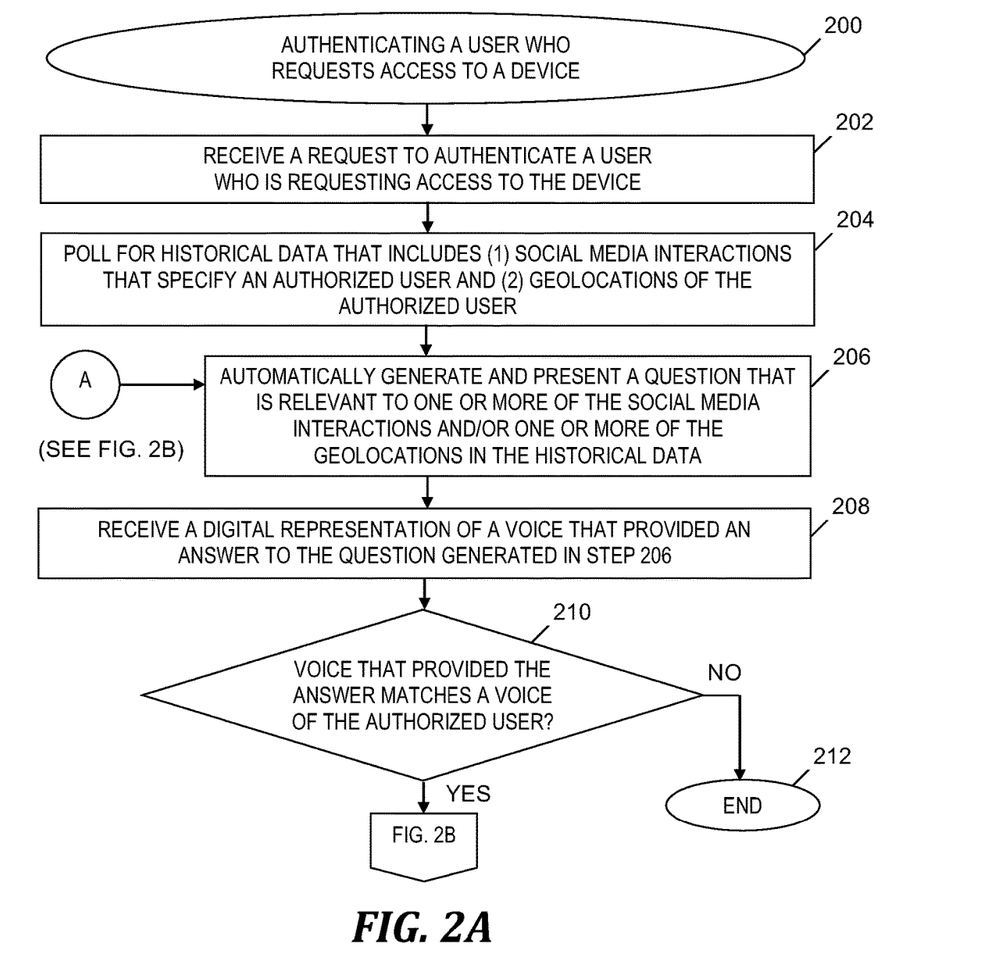
FIGS. 2A-2B depict a flowchart of a process for authenticating a user who requests an access to a device, where the process is implemented in the system of FIG. 1, in accordance with embodiments of the present invention.
Figure 2B:
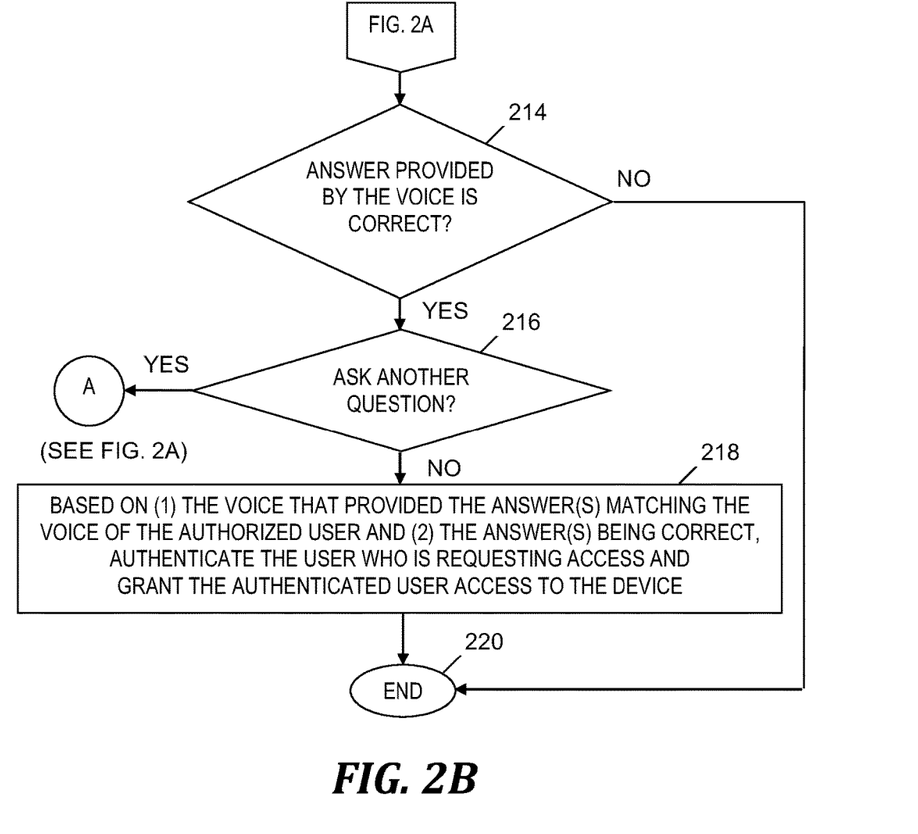

The functionality of the components shown in FIG. 1 is described in more detail in the discussion of FIGS. 2A-2B presented below.

Process for Authenticating a User Who Requests Access to a Device

FIGS. 2A-2B depict a flowchart of a process for authenticating a user who requests an access to a device, where the process is implemented in the system of FIG. 1, in accordance with embodiments of the present invention. The process of FIGS. 2A-2B starts at step 200 in FIG. 2A in which a user is requesting an access to mobile device 102 (see FIG. 1). In one embodiment, mobile device 102 (see FIG. 1) is in a hands-free environment (e.g., the user is operating a moving vehicle while operating mobile device 102 (see FIG. 1) and therefore needs to employ a hands-free operation of mobile device 102 (see FIG. 1) because of safety and/or legal concerns).

In step 202, authentication system 104 (see FIG. 1) receives a request to authenticate the user who is requesting the access to mobile device 102 (see FIG. 1). Hereinafter in the discussion of FIGS. 2A-2B, the user who is being authenticated by the request received in step 202 is referred to as simply "the user."

Prior to step 204, authentication system 104 (see FIG. 1) receives or retrieves an identification of a person who is authorized to access mobile device 102 (see FIG. 1). The person who is authorized to access mobile device 102 (see FIG. 1) is also referred to herein simply as the "authorized user." In step 204, question generator 108 (see FIG. 1) polls data repository 106 (see FIG. 1) to locate historical data that includes (1) historical social media interactions that specify the person who is authorized to access mobile device 102 (see FIG. 1) and/or (2) historical geolocations of the person who is authorized to access mobile device 102 (see FIG. 1).

In step 206, question generator 108 (see FIG. 1) automatically generates question 110 (see FIG. 1) and presents question 110 (see FIG. 1) to the user who is being authenticated. The generation of question 110 (see FIG. 1) in step 206 ensures that question 110 (see FIG. 1) is relevant to one or more of the social media interactions included in the historical data polled in step 204 and/or one or more of the geolocations included in the historical data polled in step 204.

In one embodiment, the presentation of question 110 (see FIG. 1) in step 206 is an audible presentation which uses spoken words so that the user can hear question 110 (see FIG. 1). In another embodiment, the presentation of question 110 (see FIG. 1) in step 206 is a visual presentation of question 110 (see FIG. 1) which can be seen and read by the user. Alternatively, the presentation of question 110 (see FIG. 1) in step 206 may be a combination of an audible and a visual presentation of question 110 (see FIG. 1).

The generation of a question in step 206 based on a social media interaction may be limited to using an interaction with a person who is included in a predetermined subset of the entire set of social media contacts of the authorized user. The predetermined subset may be stored in data repository 106 (see FIG. 1) or another data repository (not shown in FIG. 1), which is accessed by authentication system 104 (see FIG. 1).

After step 206 and prior to step 208, the person being authenticated speaks to generate the voice 114 (see FIG. 1), which provides an answer to question 110 (see FIG. 1). Authentication system 104 (see FIG. 1) receives voice 114 (see FIG. 1).

In step 208, digital audio system 112 (see FIG. 1) receives or generates a digital representation of voice 114 (see FIG. 1) that provided the answer to question 110 (see FIG. 1). In one embodiment, the digital representation received or generated in step 208 is in a digital audio file format. In one embodiment, digital audio system 112 (see FIG. 1) converts an analog version of voice 114 (see FIG. 1) into the aforementioned digital representation.

Prior to step 210, voice analyzer 116 (see FIG. 1) retrieves from data repository 106 (see FIG. 1) a voice template that specifies a voice pattern of the person who is authorized to access mobile device 102 (see FIG. 1). In step 210, based on the digital representation received in step 208 and the retrieved voice template that specifies the voice pattern of the person who is authorized to access mobile device 102 (see FIG. 1), voice analyzer 116 (see FIG. 1) determines whether voice 114 (see FIG. 1) that provided the answer matches a voice of the person authorized to access mobile device 102 (see FIG. 1) (i.e., voice analyzer 116 (see FIG. 1) determines whether the digital representation received in step 208 matches the voice template retrieved from data repository 106 (see FIG. 1).

If voice analyzer 116 (see FIG. 1) determines in step 210 that the voice of the person authorized to access mobile device 102 (see FIG. 1) does not match the voice template retrieved from data repository 106 (see FIG. 1), then the No branch of step 210 is followed and the process of FIGS. 2A-2B ends at step 212, with the user not being authenticated and not being granted access to mobile device 102 (see FIG. 1).

If voice analyzer 116 (see FIG. 1) determines in step 210 that the voice of the person authorized to access mobile device 102 (see FIG. 1) matches the voice template retrieved from data repository 106 (see FIG. 1), then voice analyzer 116 (see FIG. 1) verifies that voice 114 (see FIG. 1) is the voice of the authorized user, the Yes branch of step 210 is followed, and the process of FIGS. 2A-2B continues with step 214 in FIG. 2B.

Prior to step 214, answer analyzer 118 (see FIG. 1) receives or retrieves the digital representation of voice 114 (see FIG. 1) from digital audio system 112 (see FIG. 1) and determines the answer to question 110 (see FIG. 1), where the answer is included in the digital representation. In step 214 in FIG. 2B, answer analyzer 118 (see FIG. 1) determines whether the answer in the digital representation of voice 114 (see FIG. 1) is a correct answer to question 110 (see FIG. 1). In one embodiment, answer analyzer 118 (see FIG. 1) evaluates the answer to the question for accuracy based on predefined rules in data repository 106 (see FIG. 1) that specify a range of answers that are considered to be correct.

If answer analyzer 118 (see FIG. 1) determines in step 214 that the answer provided by voice 114 (see FIG. 1) is correct, then the Yes branch of step 214 is followed and step 216 is performed.

In step 216, authentication system 104 (see FIG. 1) determines whether the authentication of the user requires that the user be asked another question (i.e., authentication requires that another question be generated and presented to the user). If authentication system 104 (see FIG. 1) determines in step 216 that authentication of the user requires that the user be asked another question, then the Yes branch of step 216 is followed and the process of FIG. 2A02B loops back to step 206 in FIG. 2A.

If authentication system 104 (see FIG. 1) determines in step 216 that authentication of the user does not require the user to be asked any additional questions, then the No branch of step 216 is followed and step 218 is performed.

In step 218, based on (1) the voice 114 (see FIG. 1) that provided the answer(s) to the questions generated in step 206 (see FIG. 2A) matching the voice of the person authorized to access mobile device 102 (see FIG. 1) and (2) the answer(s) provided by voice 114 (see FIG. 1) being correct answer(s), authentication system 104 (see FIG. 1) authenticates the user and grants to the authenticated user an access to mobile device 102 (see FIG. 1) (e.g., by unlocking the lock screen of mobile device 102 (see FIG. 1)).

After step 218, the process of FIGS. 2A-2B ends at step 220.

Returning to step 214, if answer analyzer 118 (see FIG. 1) determines that the answer provided by voice 114 (see FIG. 1) is not a correct answer to the question generated in the most recent performance of step 206 (see FIG. 2A), then the No branch of step 214 is followed and the process of FIG. 2A-2B ends at step 220, with the user not being authenticated and not being granted access to mobile device 102 (see FIG. 1).

In one embodiment, the process of FIGS. 2A-2B is implemented in an expansion of computer software used to provide authentication of a user of a device.

In one embodiment, multiple profiles are stored in data repository 106 (see FIG. 1), where one profile associates the authorized user of mobile device 102 (see FIG. 1) with an access to all functions of mobile device 102 (see FIG. 1), and where another profile associates one or more third parties with respective one or more subsets of all the functions of mobile device 102 (see FIG. 1). Step 210 may be preceded by voice analyzer 116 (see FIG. 1) retrieving from data repository 106 (see FIG. 1) a voice template that specifies a voice pattern of a third party (i.e., a person different from the person who is authorized to access mobile device 102 (see FIG. 1)) and step 210 includes, based on the digital representation received in step 208 and the retrieved voice template, voice analyzer 116 (see FIG. 1) verifying that voice 114 (see FIG. 1) that provided the answer matches a voice of the third party. Based on the match of the voice 114 (see FIG. 1) to the voice of the third party, and based on the profile that associates the third party with a proper subset of the functions of mobile device 102 (see FIG. 1), authentication system 104 (see FIG. 1) authenticates the third party in step 214 and grants to the third party an access to the proper subset of the functions of mobile device 102 (see FIG. 1), as specified in the profile.

In one embodiment, the number of times step 206 (see FIG. 2A) is performed is determined by authentication system 104 (see FIG. 1) retrieving from a profile a number of questions that require answering for authentication of the user to be completed. The profile may be stored in data repository 106 (see FIG. 1). In one embodiment, the question(s) generated in step 206 (see FIG. 2A) relate to respective timeframe(s), where authentication system 104 (see FIG. 1) retrieves the timeframe(s) from a profile stored in data repository 106 (see FIG. 1).

Configuring a Device for Authentication

Figure 3:
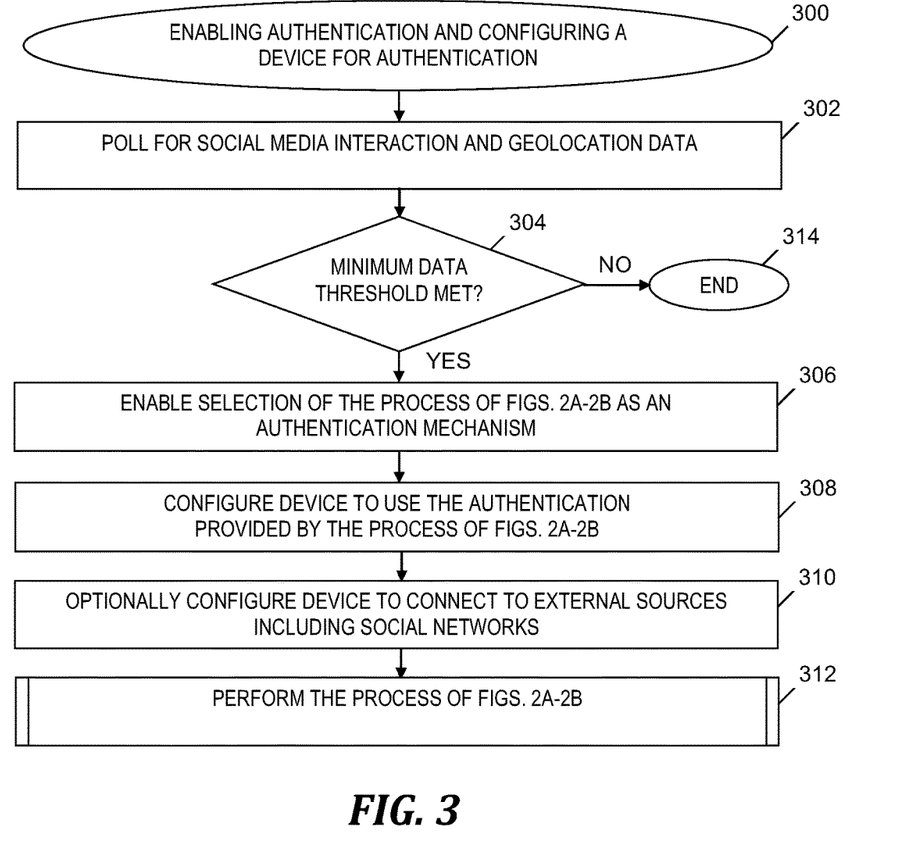
FIG. 3 is a flowchart of a process for enabling authentication and configuring a device for authentication prior to the process of FIGS. 2A-2B, in accordance with embodiments of the present invention.

FIG. 3 is a flowchart of a process for enabling authentication and configuring a device for authentication prior to the process of FIGS. 2A-2B, in accordance with embodiments of the present invention. The process of FIG. 3 starts at step 300. In step 302, authentication system 104 (see FIG. 1) polls for data including historical social media interactions that specify the person who is authorized to access mobile device 102 (see FIG. 1) and/or historical geolocations of the person who is authorized to access mobile device 102 (see FIG. 1).

In step 304, authentication system 104 (see FIG. 1) determines whether an amount of the data polled in step 302 meets a predetermined minimum data threshold. If authentication system 104 (see FIG. 1) determines that the amount of data polled meets the minimum data threshold, then the Yes branch of step 304 is followed and step 306 is performed.

In step 306, authentication system 104 (see FIG. 1) enables a selection of an authentication mechanism that implements the authentication process of FIGS. 2A-2B.

In step 308, based on a user selection of the aforementioned authentication mechanism, mobile device 102 (see FIG. 1) is configured to use the authentication process of FIGS. 2A-2B.

In step 310, mobile device 102 (see FIG. 1) is configured to connect to and retrieve data from external sources. In one embodiment, the external sources include one or more social networks of the authorized user. In another embodiment, the external sources include one or more social networks of the authorized user and one or more social networks of person(s) who are social media contact(s) of the authorized user. Step 310 is optionally performed, depending on whether the authorized user chooses an option to have mobile device 102 (see FIG. 1) connected to external sources such as social networks.

In step 312, the process of FIGS. 2A-2B is performed.

Returning to step 304, if authentication system 104 (see FIG. 1) determines that the amount of data polled meets the minimum data threshold, then the No branch of step 304 is followed and the process of FIG. 3 ends at step 314.

Computer System

Figure 4:
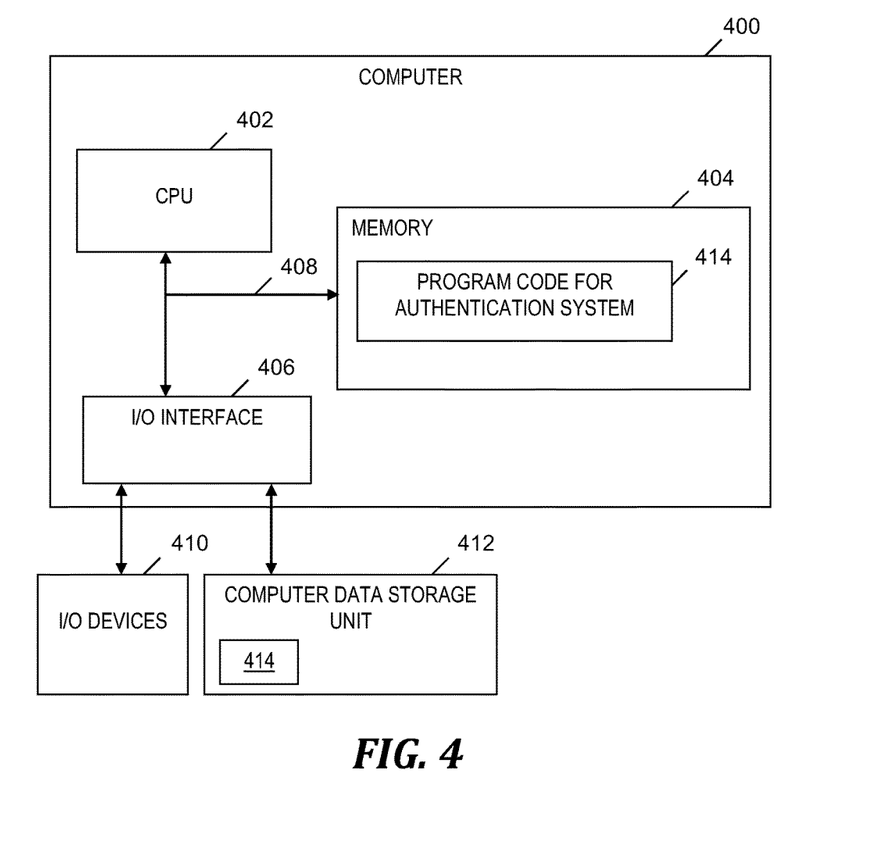
FIG. 4 is a block diagram of a computer that is included in the system of FIG. 1 and that implements the processes of FIGS. 2A-2B and FIG. 3, in accordance with embodiments of the present invention.

FIG. 4 is a block diagram of a computer that is included in the system of FIG. 1 and that implements the processes of FIGS. 2A-2B and FIG. 3, in accordance with embodiments of the present invention. Computer 400 is a computer system that generally includes a central processing unit (CPU) 402, a memory 404, an input/output (I/O) interface 406, and a bus 408. In one embodiment, computer 400 is mobile device 102 (see FIG. 1). Computer 400 is coupled to I/O devices 410 and a computer data storage unit 412. CPU 402 performs computation and control functions of computer 400, including executing instructions included in program code 414 for authentication system 104 (see FIG. 1) to perform a method of authenticating a user who requests access to a device, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display device, keyboard, etc. Bus 408 provides a communication link between each of the components in computer 400, and may include any type of transmission link, including electrical, optical, wireless, etc.

I/O interface 406 also allows computer 400 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to authenticate a user who requests access to a device. Although FIG. 4 depicts memory 404 as including program code 414, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 400 may store any combination of historical data including social media interactions that specify an authorized user of computer 400, historical data including geolocations of the authorized user of computer 400, and voice verification template(s).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to authenticating a user who requests access to a device. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 400) including one or more processors (e.g., CPU 402), wherein the processor(s) carry out instructions contained in the code causing the computer system to authenticate a user who requests access to a device. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of authenticating a user who requests access to a device.

While it is understood that program code 414 for authenticating a user who requests access to a device may be deployed by manually loading directly in client, server and proxy computers (not shown) via loading a computer-readable storage medium (e.g., computer data storage unit 412), program code 414 may also be automatically or semi-automatically deployed into computer 400 by sending program code 414 to a central server or a group of central servers. Program code 414 is then downloaded into client computers (e.g., computer 400) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of authenticating a user who requests access to a device. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 400). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 400) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B and FIG. 3) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 400) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 400), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of authenticating a user who requests an access to a device, the method comprising the steps of:
   receiving, by a hardware processor of the device, a request to authenticate the user who is requesting the access to the device;
   in response to the step of receiving the request to authenticate, polling, by the processor, for historical data that includes (1) social media interactions that specify a person authorized to access the device and (2) geolocations of the person;
   automatically generating, by the processor, a question that is relevant to a social media interaction included in the social media interactions, a geolocation included in the geolocations, or a combination of the social media interaction and the geolocation of the person authorized to access the device;
   receiving, by the processor, a digital representation of a voice that provided an answer to the question, the digital representation of the voice being generated and stored in an audio file format by a digital audio technology coupled to the hardware processor, and the voice being spoken by the user who is requesting access to the device;
   based on the received digital representation of the voice that provided the answer, verifying, by the processor, that the voice that provided the answer matches a voice of the person authorized to access the device;
   determining, by the processor, that the answer to the question is correct;
   based on (1) the voice that provided the answer matching the voice of the person authorized to access the device and (2) the answer being correct, authenticating, by the processor of the device, the user and granting to the authenticated user the access to the device;
   receiving, by the processor, a first period of time during which a first portion of the historical data that includes the geolocations is collected; and
   receiving, by the processor, a second period of time during which a second portion of the historical data that includes the social media interactions is collected,
   wherein the step of polling for the historical data includes polling first data indicating geolocations whose timestamps indicate locations of the person authorized to access the device within the first time period and polling second data indicating social media interactions whose timestamps indicate interactions within the second time period.

2. The method of claim 1, further comprising the step of receiving, by the processor, a permission to receive data being shared from a social media account of another user, wherein the data being shared includes the social media interaction, wherein the step of polling for the historical data includes polling the data in the social media account of the other user based on the received permission, and wherein the step of automatically generating the question includes generating the question so that the question is relevant to the social media interaction included in the data being shared from the social media account of the other user.

3. The method of claim 1, further comprising the steps of:
   receiving, by a processor, a second request to authenticate a third party who is requesting a second access to the device, the third party being different from the user;

in response to the step of receiving the second request to authenticate, polling, by the processor, for the historical data;
automatically generating, by the processor, a second question that is relevant to a second social media interaction included in the social media interactions, a second geolocation included in the geolocations, or a combination of the second social media interaction and the second geolocation of the person authorized to access the device;
receiving, by the processor, a second digital representation of a second voice providing an answer to the second question;
based on the received digital representation of the second voice providing the answer to the second question, verifying, by the processor, that the second voice matches a voice of a second person authorized to access a proper subset of a full set of functions of the device;
determining, by the processor, that the answer to the second question is correct;
based on (1) the second voice matching the voice of the second person and (2) the answer to the second question being correct, authenticating, by the processor, the third party and granting to the authenticated third party the second access to the device, wherein the authenticated access to the device by the user is an access to the full set of functions of the device, and wherein the authenticated second access to the device by the third party is an access to the proper subset of the full set of functions of the device.

4. The method of claim 1, further comprising the steps of:
receiving, by the processor, a number which indicates a number of questions, the number being configured by the user;
receiving, by the processor, types of the questions, the types being configured by the user;
automatically generating, by the processor, a set of one or more questions which includes the question, the set of one or more questions having a quantity of questions equal to the received number and having kinds of questions that match the received types;
based on the received digital representation of the voice, determining, by the processor, that the user provided one or more answers to the one or more questions; and
determining, by the processor, that the one or more answers provided by the user are correct, wherein the step of authenticating the user is based in part on the user having provided the correct one or more answers to the one or more questions.

5. The method of claim 1, further comprising the step of determining, by the processor, a name of a place specified by the geolocation, wherein the step of automatically generating the question includes generating the question so that the question relates the name of the place to a time when the person arrived at the place, a time when the person departed the place, or an amount of time the person spent at the place.

6. The method of claim 1, further comprising the step of:
providing at least one support service for at least one of creating, integrating, hosting, maintaining, and deploying computer-readable program code in the computer, the program code being executed by a processor of the computer to implement the steps of receiving the request to authenticate, polling for the historical data, automatically generating the question, receiving the digital representation of the voice, determining that the voice that provided the answer matches the voice of the person authorized to access the computer system, determining that the answer to the question is correct, authenticating the user, granting the access to the device, receiving the first period of time, and receiving the second period of time.

7. A computer program product, comprising:
a computer-readable storage medium; and
a computer-readable program code stored in the computer-readable storage medium, the computer-readable program code containing instructions that are executed by a central processing unit (CPU) of a computer system to implement a method of authenticating a user who requests an access to the computer system, the method comprising the steps of:
receiving, by the computer system, a request to authenticate the user who is requesting the access to the computer system;
in response to the step of receiving the request to authenticate, polling, by the computer system, for historical data that includes (1) social media interactions that specify a person authorized to access the computer system and (2) geolocations of the person;
automatically generating, by the computer system, a question that is relevant to a social media interaction included in the social media interactions, a geolocation included in the geolocations, or a combination of the social media interaction and the geolocation of the person authorized to access the computer system;
receiving, by the computer system, a digital representation of a voice that provided an answer to the question, the digital representation of the voice being generated and stored in an audio file format by a digital audio technology coupled to the CPU, and the voice being spoken by the user who is requesting access to the computer system;
based on the received digital representation of the voice that provided the answer, verifying, by the computer system, that the voice that provided the answer matches a voice of the person authorized to access the computer system;
determining, by the computer system, that the answer to the question is correct;
based on (1) the voice that provided the answer matching the voice of the person authorized to access the computer system and (2) the answer being correct, authenticating, by the computer system, the user and granting to the authenticated user the access to the computer system;
receiving, by the computer system, a first period of time during which a first portion of the historical data that includes the geolocations is collected; and
receiving, by the computer system, a second period of time during which a second portion of the historical data that includes the social media interactions that specify the user is collected,
wherein the step of polling for the historical data includes polling first data indicating geolocations whose timestamps indicate locations of the person authorized to access the computer system within the first time period and polling second data indicating social media interactions whose timestamps indicate interactions within the second time period.

8. The computer program product of claim 7, further comprising the step of receiving, by the computer system, a permission to receive data being shared from a social media account of another user, wherein the data being shared includes the social media interaction, wherein the step of polling for the historical data includes polling the data being shared from the social media account of the other user based on the received permission, and wherein the step of automatically generating the question includes generating the question so that the question is relevant to the social media interaction included in the data being shared from the social media account of the other user.

9. The computer program product of claim 7, further comprising the steps of:
receiving, by the computer system, a permission to receive data that includes a geolocation of another user;
based on the received permission, polling, by the computer system, the data that includes the geolocation of the other user; and
determining a match between the geolocation of the person authorized to access the computer system and the geolocation of the other user and between a first timestamp of the geolocation of the person and a second timestamp of the geolocation of the other user,
wherein the step of automatically generating the question includes generating the question so that the question is relevant to the person and the other user having visited a location together at one time, wherein the location is specified by the matching geolocations of the person and the other user, and wherein the one time is specified by the matching first and second timestamps.

10. The computer program product of claim 7, further comprising the steps of:
receiving, by the computer system, a second request to authenticate a third party who is requesting a second access to the computer system, the third party being different from the user;
in response to the step of receiving the second request to authenticate, polling, by the computer system, for the historical data;
automatically generating, by the computer system, a second question that is relevant to a second social media interaction included in the social media interactions, a second geolocation included in the geolocations, or a combination of the second social media interaction and the second geolocation of the person authorized to access the computer system;
receiving, by the computer system, a second digital representation of a second voice providing an answer to the second question;
based on the received digital representation of the voice providing the answer to the second question, verifying, by the computer system, that the second voice matches a voice of a second person authorized to access a proper subset of a full set of functions of the computer system;
determining, by the computer system, that the answer to the second question is correct;
based on (1) the second voice matching the voice of the second person and (2) the answer to the second question being correct, authenticating, by the computer system, the third party and granting to the authenticated third party the second access to the computer system, wherein the access to the computer system by the authenticated user is an access to the full set of functions of the computer system, and wherein the second access to the computer system by the authenticated third party is an access to the proper subset of the full set of the functions of the computer system.

11. The computer program product of claim 7, further comprising the steps of:
receiving, by the computer system, a number which indicates a number of questions, the number being configured by the user;
receiving, by the computer system, types of the questions, the types being configured by the user;
automatically generating, by the computer system, a set of one or more questions which includes the question, the set of one or more questions having a quantity of questions equal to the received number and having kinds of questions that match the received types;
based on the received digital representation of the voice, determining, by the computer system, that the user provided one or more answers to the one or more questions; and
determining, by the computer system, that the one or more answers provided by the user are correct, wherein the step of authenticating the user is based in part on the user having provided the correct one or more answers to the one or more questions.

12. A computer system comprising:
a central processing unit (CPU);
a memory coupled to the CPU;
a digital audio system coupled to the CPU; and
a computer readable storage device coupled to the CPU, the storage device containing instructions that are executed by the CPU via the memory to implement a method of authenticating a user who requests an access to the computer system, the method comprising the steps of:
receiving, by the computer system, a request to authenticate the user who is requesting the access to the computer system;
in response to the step of receiving the request to authenticate, polling, by the computer system, for historical data that includes (1) social media interactions that specify a person authorized to access the computer system and (2) geolocations of the person;
automatically generating, by the computer system, a question that is relevant to a social media interaction included in the social media interactions, a geolocation of the user included in the geolocations, or a combination of the social media interaction and the geolocation of the user of the person authorized to access the computer system;
receiving, by the computer system, a digital representation of a voice that provided an answer to the question, the digital representation of the voice being generated and stored in an audio file format by the digital audio system, and the voice being spoken by the user who is requesting the access to the computer system;
based on the received digital representation of the voice that provided the answer, verifying, by the computer system, that the voice that provided the answer matches a voice of the person authorized to access the computer system;
determining, by the computer system, that the answer to the question is correct;
based on (1) the voice that provided the answer matching the voice of the person authorized to access the computer system and (2) the answer being correct, authenticating, by the computer system, the user and granting to the authenticated user the access to the computer system;
receiving, by the computer system, a first period of time during which a first portion of the historical data that includes the geolocations is collected; and
receiving, by the computer system, a second period of time during which a second portion of the historical data that includes the social media interactions that specify the user is collected,
wherein the step of polling for the historical data includes polling first data indicating the geolocations whose timestamps indicate locations of the user within the first time period and polling second data indicting the social media interactions whose timestamps indicate interactions within the second time period.

13. The computer system of claim 12, further comprising the step of receiving, by the computer system, a permission to receive data being shared from a social media account of another user, wherein the data being shared includes the social media interaction, wherein the step of polling for the historical data includes polling the data in the social media account of the other user based on the received permission, and wherein the step of automatically generating the question includes generating the question so that the question is relevant to the social media interaction included in the data being shared from the social media account of the other user.

14. The computer system of claim 12, further comprising the steps of:
receiving, by the computer system, a permission to receive data that includes a geolocation of another user;
based on the received permission, polling, by the computer system, the data that includes the geolocation of the other user; and
determining a match between the geolocation of the person and the geolocation of the other user and between a first timestamp of the geolocation of the person and a second timestamp of the geolocation of the other user,
wherein the step of automatically generating the question includes generating the question so that the question is relevant to the person and the other user having visited a location together at one time, wherein the location is specified by the matching geolocations of the person and the other user, and wherein the one time is specified by the matching first and second timestamps.

15. The computer system of claim 12, further comprising the steps of:
receiving, by a computer system, a second request to authenticate a third party who is requesting a second access to the computer system, the third party being different from the user;
in response to the step of receiving the second request to authenticate, polling, by the computer system, for the historical data;
automatically generating, by the computer system, a second question that is relevant to a second social media interaction included in the social media interactions, a second geolocation included in the geolocations, or a combination of the second social media interaction and the second geolocation of the user of the person authorized to access the computer system;
receiving, by the computer system, a second digital representation of a second voice providing an answer to the second question;
based on the received digital representation of the second voice providing the answer to the second question, verifying, by the computer system, that the second voice matches a voice of a second person authorized to access a proper subset of a full set of functions of the computer system;
determining, by the computer system, that the answer to the second question is correct;
based on (1) the second voice matching the voice of the second person and (2) the answer to the second question being correct, authenticating, by the computer system, the third party and granting to the authenticated third party the second access to the computer system, wherein the access to the computer system by the user is an access to the full set of functions of the computer system, and wherein the second access to the computer system by the third party is an access to the proper subset of the full set of the functions of the computer system.

16. The computer system of claim 12, further comprising the steps of:
receiving, by the computer system, a number which indicates a number of questions and the number being configured by the user;
receiving, by the computer system, types of the questions, the types being configured by the user;
automatically generating, by the computer system, a set of one or more questions which includes the question, the set of one or more questions having a quantity of questions equal to the received number and having kinds of questions that match the received types;
based on the received digital representation of the voice, determining, by the computer system, that the user provided one or more answers to the one or more questions; and
determining, by the computer system, that the one or more answers provided by the user are correct, wherein the step of authenticating the user is based in part on the user having provided the correct one or more answers to the one or more questions.

* * * * *